US009563276B2

(12) United States Patent
Colby

(10) Patent No.: US 9,563,276 B2
(45) Date of Patent: Feb. 7, 2017

(54) TACTILE AND PERIPHERAL VISION COMBINED MODALITY HOVER DRIFT CUEING

(71) Applicant: Lockheed Martin Corporation, Bethesda, MD (US)

(72) Inventor: Steven D. Colby, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 587 days.

(21) Appl. No.: 14/225,784

(22) Filed: Mar. 26, 2014

(65) Prior Publication Data

US 2015/0277561 A1 Oct. 1, 2015

(51) Int. Cl.
G06F 7/70 (2006.01)
G06F 3/01 (2006.01)
B64D 45/00 (2006.01)

(52) U.S. Cl.
CPC ............... *G06F 3/016* (2013.01); *B64D 45/00* (2013.01)

(58) Field of Classification Search
USPC .......................................................... 701/14
See application file for complete search history.

(56) References Cited

U.S. PATENT DOCUMENTS

| | | |
|---|---|---|
| 4,348,186 A | 9/1982 | Harvey et al. |
| 5,296,854 A | 3/1994 | Hamilton et al. |
| 5,486,821 A | 1/1996 | Stevens et al. |
| 5,566,073 A | 10/1996 | Margolin |
| 5,920,321 A * | 7/1999 | Owen ..................... G01C 23/00 345/427 |
| 6,285,926 B1 | 9/2001 | Weiler et al. |
| 6,421,603 B1 * | 7/2002 | Pratt ...................... G01C 21/00 244/175 |
| 6,486,799 B1 | 11/2002 | Still et al. |
| 6,619,220 B1 | 9/2003 | Ducote |
| 7,010,398 B2 * | 3/2006 | Wilkins, Jr. ......... G01C 23/005 244/75.1 |

(Continued)

FOREIGN PATENT DOCUMENTS

EP 0 467 328 A2 7/1991

OTHER PUBLICATIONS

Final Rejection dated Nov. 17, 2015, in U.S. Appl. No. 14/187,533.

(Continued)

*Primary Examiner* — Hussein A. Elchanti
(74) *Attorney, Agent, or Firm* — Miles & Stockbridge P.C.

(57) ABSTRACT

Combined modality hover drift cueing methods, systems and computer readable media are disclosed. For example, some implementations can include a system comprising one or more sensors, and a combined modality hover drift cueing controller coupled to the one or more sensors and configured to determine hover drift and to control a plurality of indicators in response to determined hover drift. The system can also include a mode selector coupled to the combined modality hover drift cueing controller and configured to provide an indication of mode selection between one of a first mode, a second mode and a third mode, wherein the first mode is a combined modality mode. The system can further include a peripheral vision hover drift indicator coupled to the controller and mounted on an inside surface of an aircraft cockpit, and a tactile feedback indicator coupled to the controller.

7 Claims, 4 Drawing Sheets

(56) References Cited

U.S. PATENT DOCUMENTS

| | | | |
|---|---|---|---|
| 7,091,881 | B2 | 8/2006 | Judge et al. |
| 7,289,906 | B2 * | 10/2007 | van der Merwe ...... G01S 19/49 342/357.65 |
| 7,365,652 | B2 * | 4/2008 | Scherbarth ............ G01S 17/89 340/945 |
| 7,603,209 | B2 * | 10/2009 | Dwyer .................. G01C 23/00 340/967 |
| 7,961,117 | B1 | 6/2011 | Zimmerman et al. |
| 8,089,375 | B1 | 1/2012 | Seah |
| 8,099,234 | B1 | 1/2012 | Frank et al. |
| 8,120,548 | B1 | 2/2012 | Barber |
| 8,416,479 | B2 | 4/2013 | Kroll et al. |
| 8,742,952 | B1 | 6/2014 | Bold |
| 9,201,567 | B2 * | 12/2015 | Schrauben .......... G06F 3/04812 |
| 2003/0194683 | A1 | 10/2003 | Vorst |
| 2003/0222887 | A1 | 12/2003 | Wilkinson, Jr. et al. |
| 2004/0217883 | A1 * | 11/2004 | Judge ..................... G01C 23/00 340/946 |
| 2005/0007386 | A1 | 1/2005 | Berson et al. |
| 2006/0066459 | A1 | 3/2006 | Burch et al. |
| 2006/0235581 | A1 * | 10/2006 | Petillon .................. B64D 45/04 701/3 |
| 2006/0238377 | A1 | 10/2006 | Stiles et al. |
| 2007/0276706 | A1 * | 11/2007 | Dunsky .................. G06Q 10/02 705/5 |
| 2008/0077284 | A1 | 3/2008 | Swope |
| 2008/0180351 | A1 | 7/2008 | He |
| 2008/0243383 | A1 | 10/2008 | Lin |
| 2009/0002220 | A1 | 1/2009 | Lovberg et al. |
| 2009/0248224 | A1 * | 10/2009 | Tschannen ............. G01C 23/00 701/3 |
| 2010/0145610 | A1 | 6/2010 | Bacabara et al. |
| 2010/0231705 | A1 | 9/2010 | Yahav et al. |
| 2010/0266992 | A1 | 10/2010 | Gregoire et al. |
| 2011/0199661 | A1 | 8/2011 | Kreitmair-Steck et al. |
| 2012/0099170 | A1 | 4/2012 | Shikii et al. |
| 2013/0179010 | A1 | 7/2013 | Samuthirapandian et al. |
| 2013/0214998 | A1 | 8/2013 | Andes et al. |
| 2013/0226370 | A1 | 8/2013 | Muensterer |
| 2014/0002280 | A1 | 1/2014 | He |

OTHER PUBLICATIONS

International Search Report and Written Opinion in PCT/US15/16777 dated Dec. 8, 2015.
Nonfinal Office Action dated Dec. 9, 2015, in U.S. Appl. No. 14/107,518.
International Search Report and Written Opinion in PCT/US15/21960 dated Dec. 10, 2015.
Nonfinal Office Action dated Jun. 23, 2015, in U.S. Appl. No. 14/107,518.
Final Rejection dated Jul. 15, 2015, in U.S. Appl. No. 14/107,518.
International Search Report and Written Opinion in PCT/US2014/070446 dated Aug. 19, 2015.
Nonfinal Office Action dated Aug. 20, 2015, in U.S. Appl. No. 14/187,533.
Lif, Patrik et al., "Multimodal Threat Cueing in Simulated Combat Vehicle with Tactile Information Switching between Threat and Waypoint Indication", Swedish Defense Research Agency, Linkoping, Sweden, Human Interface, Part I, HCII, LNCS 6771, 2011, p. 454-461.
Cheung, Bob et al., "Using Tactile Cueing to Enhance Spatial Awareness under Degraded Visual Environment", Defense Research & Development Toronto, Canada, RTO-MP-HFM-181, Oct. 2009, pp. P11-1 to P11-10.
McGrath, Braden J., "Tactile Instrument for Aviation", Naval Aerospace Medical Research laboratory, Pensacola, Florida, Jul. 30, 2000, 94 pages.
"Annex B—In Flight Studies With Tactile Displays", NATO, RTO-TR-HFM-162, Mar. 12, 2012, pp. B-1 to B-10.
Notice of Allowance dated Feb. 16, 2016, in U.S. Appl. No. 14/187,533.
Final Rejection dated Apr. 5, 2016, in U.S. Appl. No. 14/107,518.

* cited by examiner

TACTILE AND PERIPHERAL VISION COMBINED MODALITY HOVER DRIFT CUEING

Some implementations relate general y to avionics and, more particularly, to methods, systems and computer readable media for combined modality hover drift cueing, e.g. including tactile feedback and peripheral vision cueing.

Vehicles such as aircraft, spacecraft, land vessels (e.g. hovercraft), surface water vessels, and underwater vessels may need to maintain a relatively constant position during operation. For example, rotary wing aircraft (and tilt rotor aircraft such as the V-22 Osprey) are routinely required to approach and land at sites without navigation guidance and/or in limited visibility conditions. Often the topography, ground hazards, obstacles and weather in the area are unknown or changing. Upon arrival at a landing or hover site, the pilot typically makes critical judgments based on incomplete or inaccurate data in order to determine the proper procedure to approach and land. If the terrain condition is such that dust, snow, sand, or the like will be stirred by rotor downwash, the aircraft may become engulfed in a cloud of visually-restrictive material. This is commonly referred to as a degraded visual environment (DVE) or a "brownout/whiteout" situation.

Spatial disorientation in a DVE is a common cause of incidents according to some literature reviews, pilot interviews, and military incident reports. During approach to hover and landing, the pilot may manipulate the aircraft controls to conduct a constant deceleration of longitudinal velocity while coordinating a rate of descent to the ground (or hover point) in such a way as to arrive with little or no forward velocity and a low rate of descent. In addition to controlling a rate of descent, the pilot must also typically compensate for forward, aft, lateral, and heading drift.

In a DVE, such as instrument meteorological conditions (IMC) or brownout/whiteout situations, a pilot may be denied both his peripheral vision cues and relative speed and drift sensations provided by his/her subconscious vision channels. Some conventional instrument flight displays may require a pilot to use the central portion of his/her visual known as the fovea centralis, The fovea centralis occupies a small portion of the central field of view (e.g., 1% of the visual area of the retina), but may use 50% of the visual cortex in the brain. Thus, by presenting critical hover drift information to this area of a pilot's visual field, a mental processing bandwidth constraint is created in highly task loaded environments. Also, tactile (or haptic) feedback can be used to provide information to a pilot (or vehicle operator) without creating an additional visual input. Some implementations were conceived in light of the above-mentioned problems and limitations, among other things.

Some implementations can include a system comprising one or more sensors, and a combined modality hover drift cueing controller coupled to the one or more sensors and configured to determine hover drift and to control a plurality of indicators in response to determined hover drift. The system can also include a mode selector coupled to the combined modality hover drift cueing controller and configured to provide an indication of mode selection between one of a first mode, a second mode and a third mode, wherein the first mode is a combined modality mode. The system can further include a peripheral vision hover drift indicator coupled to the controller and mounted on an inside surface of an aircraft cockpit, and a tactile feedback indicator coupled to the controller.

A hover drift cueing signal can be sent to both the peripheral vision hover drift indicator and the tactile feedback indicator when the mode selector is in the first mode. The hover drift cueing signal can be sent to only the peripheral vision hover drift indicator when the mode selector is in the second mode. The hover drift cueing signal can be sent to only the tactile feedback indicator when the mode selector is in the third mode.

The sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera. The system can also include a second hover drift indicator coupled to the controller.

The first hover drift indicator can be configured to indicate fore/aft drift, The second hover drift indicator can be configured to indicate lateral drift. The first hover drift indicator can be mounted on a door frame of the aircraft adjacent a pilot's scat so as to be visible in a peripheral vision field of the pilot. The second hover drift indicator can be mounted adjacent to a central instrument panel of the aircraft no as to be visible in a peripheral vision field of the pilot.

Some implementations can include a method comprising receiving, at a processor, vehicle position information from one or more sensors disposed on the vehicle, and determining, at the processor, position drift based on the received vehicle position information. The method can also include controlling, with the processor, a peripheral vision position drift indicator and a tactile feedback position drift indicator based on the determined position drift.

The vehicle can include one of a land vehicle, a surface water vessel, an underwater vessel, an aircraft and a spacecraft The peripheral vision position drift indicator can include a first position drift indicator and a second position drift indicator. The peripheral vision hover drift indicator can include a third position drift indicator coupled to the processor.

The first position drift indicator can be configured to indicate fore/aft drift. The second position drift indicator can be configured to indicate lateral drift. The first position drift indicator can be mounted on a door frame of the vehicle adjacent an operator's seat so as to be visible in a peripheral vision field of the operator. The second position drift indicator can be mounted adjacent to a central instrument panel of the vehicle so as to be visible in a peripheral vision field of the operator.

Some implementations can include a nontransitory computer readable medium having stored thereon software instructions that, when executed, cause a processor to perform operations. The operations can include receiving, at a processor, aircraft position information from one or more sensors disposed on the aircraft. The operations can also include determining, at the processor, hover drift based on the received aircraft position information. The operations can further include controlling, with the processor, a peripheral vision hover drift indicator and a tactile feedback hover drift indicator based on the determined hover drift.

The one or more sensors can include one or more of a radar altimeter, an air data system, an inertial navigation system, a traffic alert and collision avoidance system, an Enhanced Ground Proximity Warning System (EGPWS) Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera. The peripheral vision hover drift indicator can include a first hover drift indicator and a second hover drift indicator. The first hover drift indicator can be configured to indicate fore/aft drift and is mounted on a door frame of the aircraft adjacent a pilot's seat so as to be visible in a peripheral vision field of the pilot. The second hover drift indicator can be configured to indicate lateral drift and is mounted adjacent to a central instrument panel of the aircraft so as to be visible in a peripheral vision field of the pilot.

DETAILED DESCRIPTION

While examples are discussed in terms of aircraft, such as rotary wing aircraft, it will be appreciated that implementations can be configured for use with other vehicles. In general, an embodiment can be configured for use on vehicles that may experience 2- or 3-dimensional drift, or which may need to hold a steady position or course. Vehicles for which an embodiment may be configured can include land vehicles (e.g., cars, trucks, motorcycles, all terrain vehicles, hovercraft, trains, remote exploration vehicles, underground vehicles and the like), surface water vessels (e.g., boats, ships, personal watercraft and the like), underwater vessels (submarines, submersibles, remote operated vehicles (ROVs) and the like), aircraft (e.g., airplanes, helicopters, vertical takeoff and landing aircraft (VTOLs), short take off and landing (STOL) aircraft, lighter-than-air vessels, dirigibles, blimps, gliders, unmanned aerial vehicles (UAVs) and the like) and spacecraft (e.g., rockets, orbiters, space stations and the like).

Figure 1:
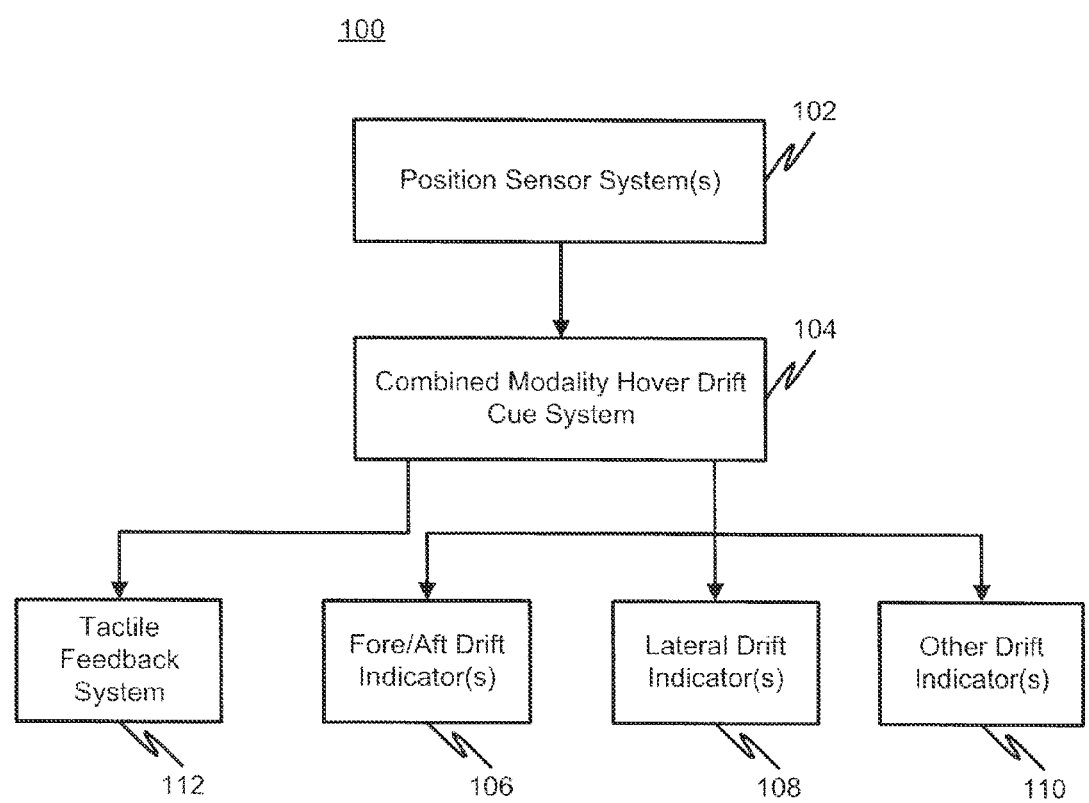
FIG. 1 shows a diagram of an example combined modality hover drift cueing system in accordance with some implementations.

FIG. 1 shows a diagram of an example peripheral vision hover drift cueing system in accordance with some implementations. The system 100 includes one or more high. data rate velocity sensor and/or position sensor systems 102, a peripheral vision hover drift cueing system 104 (or controller), one or more fore/aft drift indicators 106, one or more lateral drift indicators 108, one or more optional other drift indicators 110 for a parameter such as heading, altitude or the like, and a tactile feedback system 112. The system 100 can also include an altitude data source 114.

In operation, the velocity and/or position sensor systems 102 generate velocity and/or position information, which is transmitted to the peripheral vision hover drift cueing system 104. The high data rate velocity sensors can. include one or more of an EGI, a Doppler, an INS, a Kalman Filtered INS or the like. The position sensor systems 102 can include, for example, one or more of a radar altimeter, an air data system, an inertial navigation system, a traffic alert and collision avoidance system, an Enhanced Ground Proximity Warning System (EGPWS)Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera. In addition to the above-mentioned example sensors, traditional avionics instruments (altimeter, vertical speed indicator, compass, air speed indicator or the like) could also be included in the sensor system 102.

The peripheral vision hover drift cueing system 104 uses the received velocity and/or position information to determine if the aircraft is drilling from hover. For example, the peripheral vision hover drift cueing, system 104 can use the high data rate velocity information to determine if the aircraft is drifting in hover. Also, alternatively, the system can compare the position information received over time to determine if the aircraft is drifting in hover. Drifting from hover can occur in one or more directions and/or axes such as fore/aft, lateral, heading, altitude, yaw, pitch and/or roll.

If the peripheral vision hover drift cueing system 104 determines drift is occurring, the peripheral vision hover drift cueing system 104 can cause a signal to be sent to one or more peripheral vision indicators, such as the fore/aft drift indicator(s) 106, the lateral drift indicators 108 and/or the other drift indicator(s) 110 and/or the tactile feedback system 112. The system can include a mode selector that permits an operator (e.g., pilot, driver or the like) to select a cueing mode. For example, in a dual modality system having peripheral vision cueing and tactile feedback, the mode selector can select between combined (e.g., tactile and peripheral), only peripheral vision cueing, or only tactile feedback cueing.

The drift indicators (e.g., 106-110) can include one or more light emitting diodes (LEDs). In order to provide a peripheral vision cue, the indicator can cause the LEDs to appear to be moving (e.g., in a direction of the drift). For example, if the aircraft is drifting in an aft direction, the fore/aft indicator can be used to show this drift by causing the LEDs to appear to move in a direction that would suggest all movement in the pilot's peripheral vision.

Figure 3:
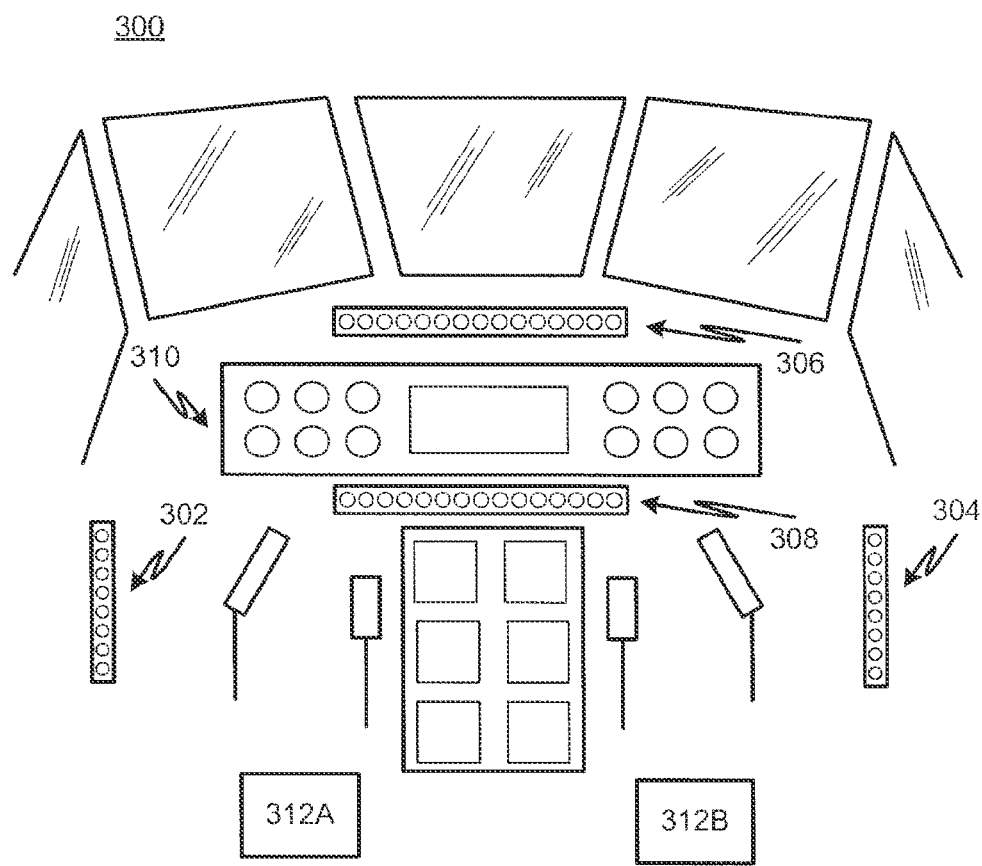
FIG. 3 is a diagram of an example aircraft cockpit having a combined modality hover drift cueing system in accordance with some implementations.

The indicators can be placed within the cockpit in locations for viewing by the pilot's peripheral vision. For example, the lateral drift indicator can be placed above or below the main instrument panel. The fore/aft indicator can be placed on a door or doorframe of the aircraft to an outside side of a pilot's seat. An example placement of peripheral vision hover drift cueing indicators is shown in FIG. 3 and described below. In addition to, or as an alternative to, using apparent motion, the indicators can use color change, brightness change, flashing or the like to indicate drift and/or amount or rate of drift. Also, the system can take into account the altitude of the aircraft using the altitude data source 114 in order to produce visual cues that mimic real world visual cues and include a representation of parallax (or parallax-related) effect. For example, the visual cues could include more swift movement closer to the ground and slower movement relative to ground references at higher altitudes (e.g., above about 100 feet). The visual cues drift display movement could be generated to have the same (or similar) movement rate as would he experienced by a pilot when observing the ground from the aircraft. The system could also take into account proximity of the aircraft/vehicle to another object of reference to determine the apparent movement, speed of the visual cues.

The tactile (or haptic) feedback system 112 can include feedback devices for applying forces, vibrations, motions or other sensations to the user via mechanical, electrical, pressure and/or temperature stimulation. The tactile devices may incorporate tactile sensors that measure forces exerted by the user on the interface. Examples of pilot tactile feedback systems can include wearable tactile feedback vests or other clothing. The tactile feedback system can include actuators configured to give an operator a sensation to help indicate position drift (e.g., hover drift).

Figure 2:
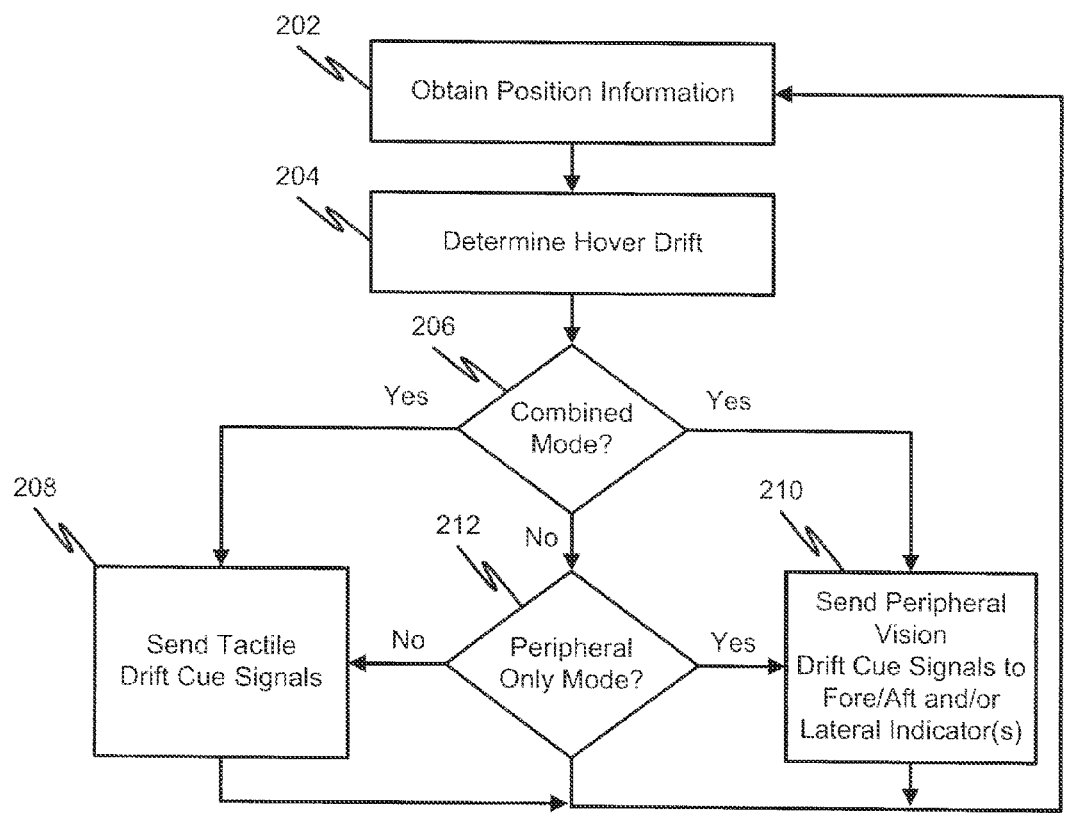
FIG. 2 shows a flow chart of an example method for combined modality hover drift cueing in accordance with some implementations.

FIG. 2 shows a flow chart of an example method for peripheral vision hover drift cueing in accordance with some implementations. Processing begins at 202, where high data rate velocity (and/or position) information is obtained. For example, information from one or more sensors (e.g., 102) can be obtained by a peripheral vision hover drift cueing system (e.g., 104). The information can include flight information such as velocity, height above ground, groundspeed, ground track, wind direction, wind speed, location of a landing/hover zone, location of other aircraft, aircraft performance, or the like. Processing continues to 204.

At 204, the system determines if hover drift is occurring. For example, the system can determine drift form velocity information or by comparing current position information with previous position information, Processing continues to 206.

At 206, the system determines whether combined mode is selected. If combined mode is selected, the cueing signal is sent to all modalities, e.g., sent to peripheral vision (106-108) and tactile feedback systems 112. Processing continues to 208 and 210 if the combined mode is selected. Processing continues to 212 if the combined mode is not selected.

At 208, a tactile drift (or position) cue signal is sent to the tactile feedback actuators. Processing continues back to 202.

At 210, a peripheral vision drift cue signal is sent to one or more indicators (e.g., fore/aft and/or lateral). For example, the system sends a signal to each indicator (e.g., 106 110) according to the determined amount of drift.

At 212, the system determines if peripheral vision only mode is selected. if so, then processing continues to 210. Otherwise, processing continues to 208.

It will be appreciated that 202-212 can be repeated in whole or in part in order to accomplish a contemplated combined modality hover drift cueing task.

FIG. 3 is a diagram of an example aircraft cockpit 300 having a combined modality (peripheral vision and tactile) hover drift cueing system in accordance with some implementations. In particular, the cockpit 300 includes a first fore/aft drift indicator 302 disposed on the port side door of the aircraft, a second fore/aft drift indicator 304 disposed on the starboard side door of the aircraft, a lateral drift indicator (306 or 308) disposed above or below the instrument panel 310. The system can also include one or more tactile feedback actuators or indicators 312A and 312B, e.g., for a pilot and a copilot, respectively.

In operation, the indicators (302-308 and 312A-312B) can be controlled by a combined modality hover drift cueing system (e.g., 104) in accordance with a method or process for peripheral vision hover drift cueing (e.g., 202-212).

Figure 4:
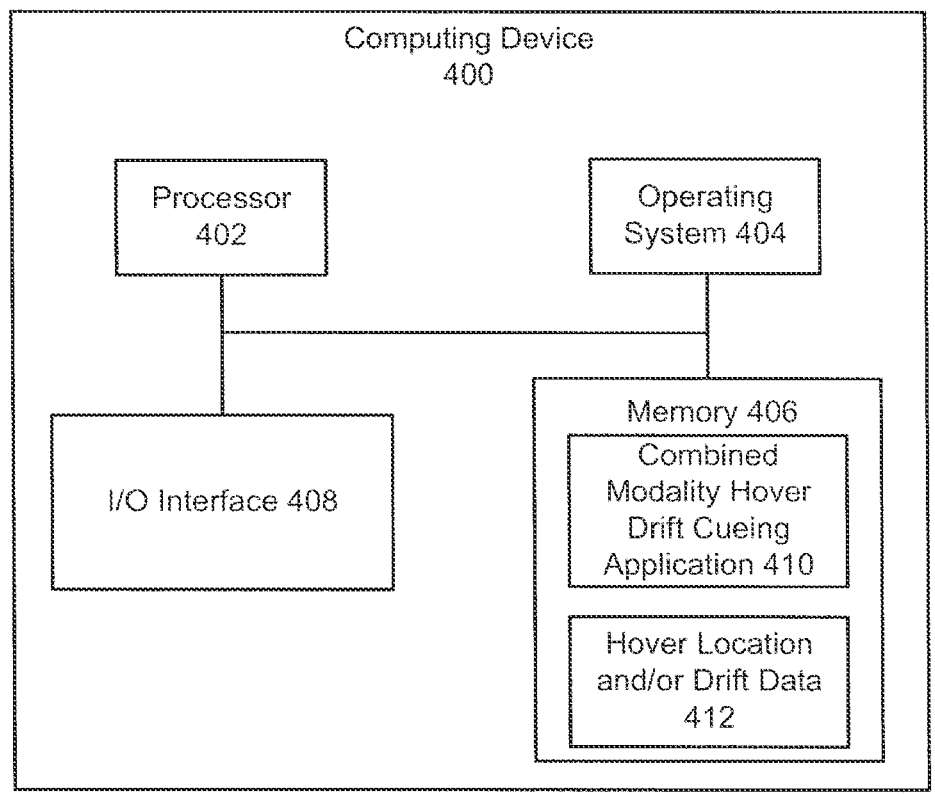
FIG. 4 is a diagram of an example computing system for combined modality hover drift cueing in accordance with some implementations.

FIG. 4 is a diagram of an example computing device for combined modality hover drift cueing in accordance with some implementations. The computing device 400 includes a processor 402, an operating system 404, a memory 406 and an I/O interface 408. The memory 406 can store a combined modality hover drift cueing application 410 and hover location, position and/or drift data 412.

In operation, the processor 402 may execute the combined modality hover drift cueing application 410 stored in the memory 406. The combined modality hover drift cueing application 410 can include software instructions that, when executed by the processor 402, cause the processor 402 to perform operations for combined modality hover drift cueing in accordance with the present disclosure (e.g., the combined modality hover drift cueing application 410 can cause the processor to perform one or more of steps 202-212 described above and, in conjunction, can access the hover location, aircraft position and/or drift data 412). The combined modality hover drift cueing application 410 can also operate in conjunction with the operating system 404.

The computer (e.g., 400) can include, but is not limited to, a single processor system, a multi-processor system (co-located or distributed), a cloud computing system, or a combination of the above.

A network can connect the sensors, the combined modality hover drift cueing system and the indicators. The network can be a wired or wireless network, and can include, but is not limited to, an aircraft signal bus, a WiFi network, a local area network, a wide area network, the Internet, or a combination of the above.

The data storage, memory and/or nontransitory computer readable medium can be a magnetic storage device hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for performing one or more combined modality hover drift cueing tasks as described herein). The stored software instructions can be executed on a programmed general purpose computer, a special purpose computer, a microprocessor, or the like.

The computing device 400 can be a standalone computing device or a device incorporated in another system, such as an avionics system or flight computer.

It is, therefore, apparent that there is provided, in accordance with the various implementations disclosed herein, methods, systems and computer readable media for combined modality position (e.g., hover) drift cueing.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A system comprising:
   one or more sensors;
   a combined modality hover drift cueing controller coupled to the one or more sensors and configured to determine hover drift and to control a plurality of indicators in response to determined hover drift;
   a mode selector coupled to the combined modality hover drift cueing controller and configured to provide an indication of mode selection between one of a first mode, a second mode and a third mode, wherein the first mode is a combined modality mode;
   a peripheral vision hover drift indicator coupled to the controller and mounted on an inside surface of an aircraft cockpit; and
   a tactile feedback indicator coupled to the controller, wherein a hover drift cueing signal is sent to both the peripheral vision hover drift indicator and the tactile feedback indicator when the mode selector is in the first mode. and wherein the hover drift cueing signal is sent to only the peripheral vision hover drift indicator when the mode selector is in the second mode and wherein the hover drift cueing signal is sent to only the tactile feedback indicator when the mode selector is in the third mode.

2. The system of claim 1, wherein the sensors include one or more high data rate velocity sensors.

3. The system of claim 1, further comprising a second hover drift indicator coupled to the controller.

4. The system claim 1, wherein the first hover drift indicator is configured to indicate fore/aft drift.

5. The system of claim 3, wherein the second hover drift indicator is configured to indicate lateral drift.

6. The system claim 4, wherein the first hover drift indicator is mounted on a door frame of the aircraft adjacent a pilot's seat so as to be visible in a peripheral vision field of the pilot.

7. The system of claim 5, wherein the second hover drift indicator is mounted adjacent to a central instrument panel of the aircraft so as to be visible in a peripheral vision field of the pilot.

* * * * *